(12) United States Patent
Abubakar et al.

(10) Patent No.: US 9,176,244 B2
(45) Date of Patent: Nov. 3, 2015

(54) DATA SET INVERSION USING SOURCE-RECEIVER COMPRESSION

(75) Inventors: Aria Abubakar, North Reading, MA (US); Ashok Belani, Paris (FR); Vladimir L. Druskin, Brookline, MA (US); Tarek Habashy, Burlington, MA (US); Mikhail Zaslavsky, Cambridge, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 173 days.

(21) Appl. No.: 12/751,188

(22) Filed: Mar. 31, 2010

(65) Prior Publication Data

US 2011/0246140 A1    Oct. 6, 2011

(51) Int. Cl.
  *G06G 7/48*    (2006.01)
  *G01V 1/28*    (2006.01)

(52) U.S. Cl.
  CPC .............. *G01V 1/28* (2013.01); *G01V 2210/67* (2013.01)

(58) Field of Classification Search
  CPC ....................................................... G01V 1/28
  USPC ................................................. 703/2, 5, 10
  See application file for complete search history.

(56) References Cited

U.S. PATENT DOCUMENTS

| 4,870,580 | A | 9/1989 | Lang et al. |
| 6,700,381 | B2 | 3/2004 | Oristaglio et al. |
| 2008/0314582 | A1 | 12/2008 | Belani et al. |
| 2009/0010103 | A1 | 1/2009 | Sallas et al. |
| 2009/0174402 | A1* | 7/2009 | Rottengatter et al. ........ 324/303 |

OTHER PUBLICATIONS

Li et al. "Regularized Gauss-Newton Method using Compressed Jacobian Matrix for Controlled Source Electromagnetic Data Inversion", SEG Houston 2009 International Exposition and Annual Meeting.*
Abubakar et al. (inventors): Microwave Data Inversions Using the Source-Receiver Compression Scheme; IEEE Transactions on Antennas and Propagation, vol. 60, No. 6, Jun. 2012; pp. 2853-2864.*
Plessix et al.: Resistivity imaging with controlled-source electromagnetic data: depth and data weighting; Inverse Problems 24 (2008) 034012 (23pp).*
Pratt et al., "Gauss-newton and Full Newton Methods in Frequency-space Seismic Waveform Inversion," Geophysical Journal International, May 1998, vol. 133(2): pp. 341-362.
Morton et al., "Fastershot-record Depth Migrations Using Phase Encoding," Expanded Abstracts, SEG Annual Meeting, Sep. 1998: pp. 1131-1134.
Romero et al., "Phase Encoding of Shot Records in Prestack Migration," Geophysics, Mar. 2000, vol. 65(2): pp. 426-436.

(Continued)

*Primary Examiner* — Hugh Jones

(57) ABSTRACT

Source-receiver compression is used to help design surveys and mitigate the computational costs of data set inversion. The source-receiver compression is based on data redundancy and sensitivity. More particularly, a compressed source array is produced for minimum redundancy and maximum sensitivity to reservoir model parameters. The synthesized transmitter array has a reduced number of sources, thereby reducing the number of forward model simulations needed to carry out the inversion. Furthermore, the data collected at the receivers employed in the survey can be compressed. This has the implication of reducing the computational cost of constructing the Jacobian matrix and inverting the corresponding Hessian matrix.

22 Claims, 2 Drawing Sheets

(56) References Cited

OTHER PUBLICATIONS

Shin et al., "Efficient Calculation of a Partial Derivative Wavefield Using Reciprocity for Seismic Imaging and Inversion," Geophysics, Nov. 2001, vol. 66(6): pp. 1856-1863.

Abubakar et al., "Towards Non-linear Inversion for Characterization of Time-lapse Phenomena Through Numerical Modelling," Geophysical Prospecting, Jul. 2003, vol. 51(4): pp. 285-293.

Habashy et al., "A General Framework for Constrained Minimization for the Inversion of Electromagnetic Measurements," Progress in Electromagnetics Research, 2004, vol. PIER 46: pp. 265-312.

Operto et al., "3D Finite-Difference Frequency-domain Modeling of Visco-acoustic Wave Propagation Using a Massively Parallel Direct Solver: A Feasibility Study," Geophysics, Sep.-Oct. 2007, vol. 72(5): pp. SM195- SM211.

Vigh et al., "3D Prestack Plane-Wave, Full-waveform Inversion," Geophysics, Sep.-Oct. 2008, vol. 73(5): pp. VE135-VE144.

Hu et al., "Simultaneous Multifrequency Inversion of Full-waveform Seismic Data," Geophysics, Mar.-Apr. 2009, vol. 74(2): pp. R1-R14.

Hu et al., "Preconditioned Non-Linear Conjugate Gradient Method for Seismic Full-waveform Inversion," Expanded Abstracts, U018, 71st EAGE Conference & Exhibition, Jun. 2009: pp. 1-5.

Ben-Hadj-Ali et al., "Efficient 3D Frequency-domain Full Waveform Inversion (FWI) with Phase Encoding," Expanded Abstracts P004, 71st EAGE Conference & Exhibition, Jun. 2009: pp. 1-5.

Herrmann et al., "Compressive Sensing Applied to Full-waveform Inversion," Expanded Abstracts S016, 71st EAGE Conference & Exhibition, Jun. 2009: pp. 1-4.

Krebs et al., "Fast Full-wavefield Seismic Inversion Using Encoded Sources," Geophysics, Nov.-Dec. 2009, vol. 74(6): pp. WCC177-WCC188.

Abubakar et al., "Application of the Finite-difference Contrast-source Inversion Algorithm to Seismic Full-waveform Data," Geophysics, Nov.-Dec. 2009, vol. 74(6): pp. WCC47-WCC58.

International Search Report and Written Opinion of PCT Application No. PCT/US2011/030450 dated Oct. 28, 2011.

\* cited by examiner

DATA SET INVERSION USING SOURCE-RECEIVER COMPRESSION

BACKGROUND OF THE INVENTION

The present invention is generally related to surveying subterranean formations to facilitate recovery of natural resources, and more particularly to designing surveys and reducing the computational overhead associated with processing survey data.

Developments in numerical computation techniques have motivated research on Full-Waveform Inversion (FWI) approaches for geophysical applications. For example, R. G. Pratt, C. Shin, and G. J. Hicks, Gauss-newton and full newton methods in frequency-space seismic waveform inversion, Geophysical Journal International, 13, 341-362 (1998); C. Shin, K. Yoon, K. J. Marfurt, K. Park, D. Yang, H. Y. Lim, S. H. Chung, and S. Shin, Efficient calculation of a partial derivative wavefield using reciprocity for seismic imaging and inversion, Geophysics, 66, 1856-1863 (2001); A. Abubakar, P. van den Berg, and J. T. Fokkema, Towards non-linear inversion for characterization of timelapse phenomena through numerical modelling, Geophysical Prospecting, 51, 285-293 (2003); S. Operto, J. Virieux, P. Amestoy, J.-Y. L'Excellent, L. Giraud, and H. Ben-Hadj-Ali, 3D finite-difference frequency-domain modeling of visco-acoustic wave propagation using a massively parallel direct solver, A feasibility study: Geophysics, 72, SM195-SM211 (2007); D. Vigh, and E. W. Starr, 3D prestack plane-wave fullwaveform inversion, Geophysics, 73, VE135-VE144 (2008); W. Hu, A. Abubakar, and T. M. Habashy, Preconditioned non-linear conjugate gradient method for seismic full-waveform inversion, in Expanded Abstracts, U018, 71st EAGE Conference & Exhibition (June 2009); W. Hu, A. Abubakar, and T. M. Habashy, Simultaneous multifrequency inversion of fullwaveform seismic data, Geophysics, 74, R1-R14 (2009); Abubakar, W. Hu, T. M. Habashy, and P. M. van den Berg, Application of the finite-difference contrast-source inversion algorithm to seismic full-waveform data, Geophysics, 74, WCC163-WCC174 (2009). FWI seismic inversion generally deals with processing a large size data set, which tends to be a processing bottleneck. A large number of sources in the survey contributes to a large computational cost in running the forward simulator a number of times corresponding to the number of sources. A large number of receivers contributes to the computational cost of constructing the sensitivity (Jacobian) matrix as well as in inverting the Hessian matrix in a gradient-type inversion approach. Recently a simultaneous-source encoded FWI approach has been proposed to reduce the number of sources used in the inversion, see H. Ben-Hadj-Ali, S. Operto, and J. Virieux, Efficient 3d frequency-domain full waveform inversion (fwi) with phase encoding, in Expanded Abstracts, P004, 71st EAGE Conference & Exhibition (2009); F. J. Herrmann, Y. Erlangga, and T. T. Y. Lin, Compressive sensing applied to fullwave form inversion, in Expanded Abstracts, 5016, 71st EAGE Conference & Exhibition (2009); J. Krebs, J. Anderson, D. Hinkley, R. Neelamani, S. Lee, A. Baumstein, and M. D. Lacasse, Fast full-wavefield seismic inversion using encoded sources Geophysics (2009). In this approach a large number of physical sources are converted into one simultaneous source or several simultaneous sources by summing up the individual physical sources using a phase encoding technique (see S. A. Morton, and C. C. Ober, Faster shot-record depth migrations using phase encoding, in Expanded Abstracts, 1131-1134, SEG Annual Meeting (1998)). This phase encoding technique has also been applied for the prestack migration as in L. A. Romero, D. C. Ghiglia, C. C. Ober, and S. A. Morton, Phase encoding of shot records in prestack migration, Geophysics (2000). It has been pointed out that this approach is more sensitive to noise than the standard FWI method. J. Krebs, J. Anderson, D. Hinkley, R. Neelamani, S. Lee, A. Baumstein, and M. D. Lacasse, Fast full-wavefield seismic inversion using encoded sources Geophysics (2009) attempted to reduce this noise problem by changing the encoding scheme that is used in the inversion in each inversion iteration. However, this results in the increase number of iterations needed by the simultaneous-source encoded FWI approach. Several techniques for estimating a subsurface electromagnetic model by iteratively minimizing the difference between observed and simulated data are described in T. M. Habashy and A. Abubakar, A general framework for constrained minimization for the inversion of electromagnetic measurements, Progress in Electromagnetics Research, PIER 46, pp. 265-312, (2004) and the references therein.

SUMMARY OF THE INVENTION

The inventors have recognized that part of a survey data set can be redundant or lacking in sensitivity to relevant reservoir model parameters. For example, a non-optimally designed survey can result in such redundancy or lack of sensitivity. The present invention is predicated in part on recognition that the computational cost of inverting a set of data can be mitigated by detecting and removing from the calculation data that is redundant or lacking sensitivity.

In accordance with an aspect of the invention, a computer program product comprises a computer usable medium having a computer readable program code embodied therein, said computer readable program code adapted to be executed to implement a method of compression for inversion of survey data associated with an array of physical transmitters and an array of physical receivers, said method comprising: calculating a compressed data set in which a number of representative transmitters, receivers, or some combination thereof is reduced by calculating a weighted sum of physical transmitters, physical receivers, or both; performing inversion; and outputting a result in tangible form.

In accordance with another aspect of the invention, an apparatus comprises: an array of physical transmitters; an array of physical receivers; and one or more processing devices that function alone or in combination to cause the transmitters to produce excitations that are introduced to a subterranean formation and detected by the receivers, and to process data from the receivers by calculating a compressed synthetic data set in which a number of representative transmitters, receivers, or some combination thereof is reduced by calculating a weighted sum of physical transmitters, physical receivers, or both, perform inversion, and output a result in tangible form.

Advantages of embodiments of the invention include reduced computational cost and computer memory storage. This advantageously reduces the time required to produce a desired result from a survey and the size of the model that can be processed. Another advantage is that the invention is model-independent in the sense that it does not rely on knowledge of a reservoir model. Other advantages may be apparent in view of the detailed description and figures.

DETAILED DESCRIPTION

Figure 1:
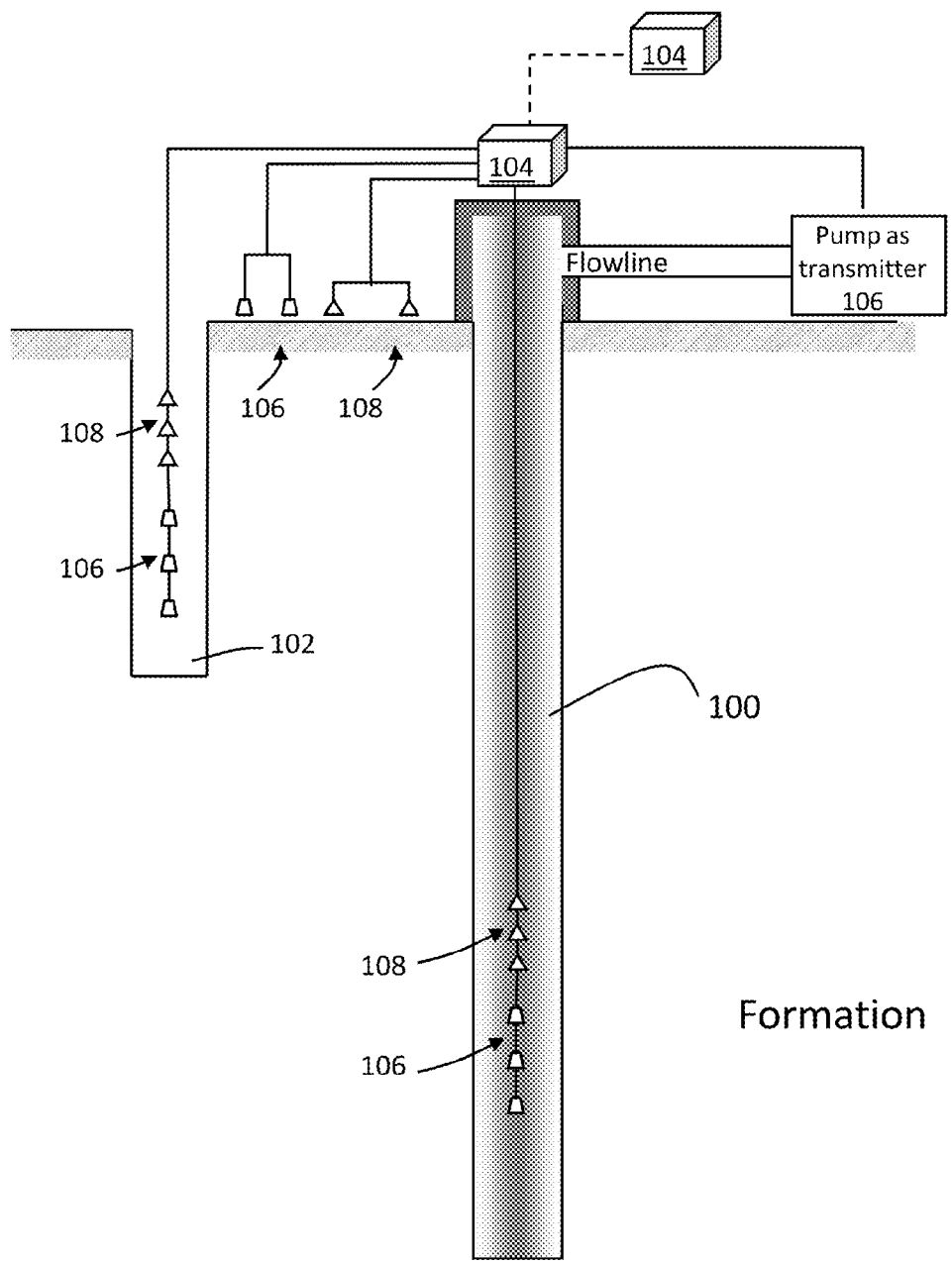
FIG. 1 illustrates apparatus for analyzing a subterranean formation to facilitate recovery of natural resources.

FIG. 1 illustrates apparatus for surveying a subterranean formation to facilitate recovery of natural resources. An analyzer and control unit 104 is placed in communication with at least one array of excitation sources (transmitters) 106 and at least one array of receivers 108. The invention is not limited to any particular type of excitation source and may be used with excitation sources including but not limited to electromagnetic (EM), seismic, sonic, gravimetric and pressure. Depending on how the formation is to be surveyed, boreholes 100, 102 may be present in the formation. However, the invention is not limited to any particular transmitter-receiver placement and may be used for measurements including but not limited to surface-to-surface, surface-to-borehole, borehole-to-surface, cross-well, and single well. Consequently, arrays transmitters and receivers may be disposed at the surface, in one or more boreholes or wells, or combinations thereof. The analyzer and control unit may include processing hardware and computer-readable memory for storing and operating computer program code that controls the transmitters, receives survey data via the receivers, stores the received data in tangible form, and processes the received data to produce one or more models that are stored in tangible form. Although depicted with a single block, functions of the analyzer and control unit 100 may be performed by different physical devices which may be operated at different locations, e.g., a device that gathers data at the worksite and another device that processes the data at a data processing facility.

Figure 2:
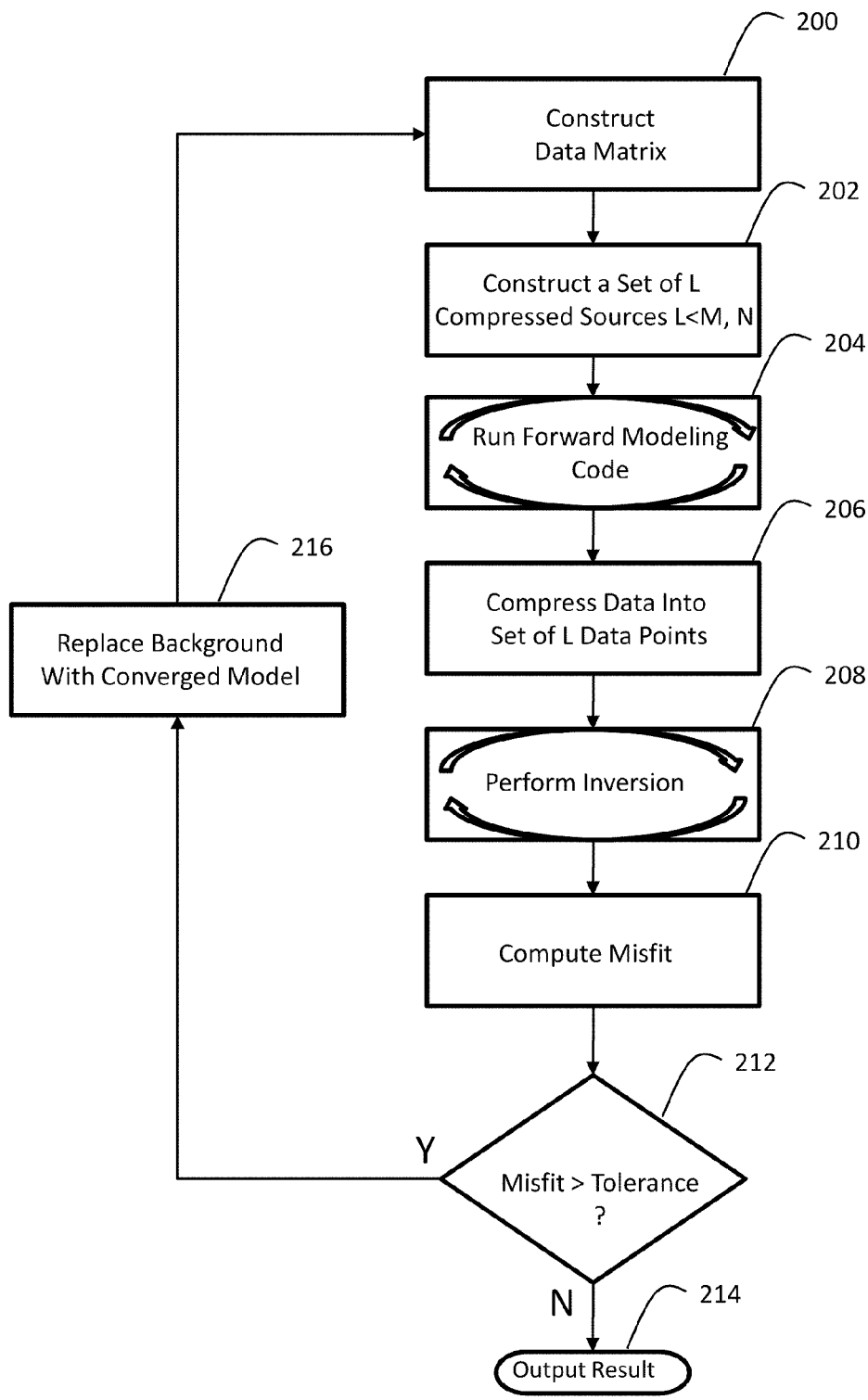
FIG. 2 is a flow diagram that illustrates a method for inversion using source-receiver compression.

Referring now to FIGS. 1 and 2, a set of data for an array of transmitters and receivers can be arranged in the form of a matrix $\overline{D}$, where the element $D_{ij}$ corresponds to the measured response at the j-th receiver due to the i-th transmitter. The data matrix $\overline{D}$ is a rectangular matrix of dimension M×N where M is the total number of transmitters and N is the total number of receivers. The case of interest in this description is for M≥2 and N≥2. Through a singular-value decomposition scheme, the data matrix $\overline{D}$ can be expanded as follows:

$$\overline{D} = \sum_{k=1}^{L} \lambda_k \overline{v}_k \overline{u}_k^\dagger \quad (1)$$

where † indicates complex conjugate transpose and L=min{M,N}. $\overline{v}$, $\overline{u}$ and $\lambda$ are the left-singular vectors, the right singular vectors and the singular values of the data matrix $\overline{D}$, respectively. The following orthonormality relationships hold:

$$\overline{v}_i^\dagger \cdot \overline{v}_j = \delta_{ij} \quad (2)$$

$$\overline{u}_i^\dagger \cdot \overline{u}_j = \delta_{ij} \quad (3)$$

From eqs. (1), (2) and (3):

$$\overline{D} \cdot \overline{u}_k = \lambda_k \overline{v}_k \quad (4)$$

$$\overline{D} \cdot \overline{v}_k = \lambda_k \overline{u}_k \quad (5)$$

and from eqs. (4) or (5) and eqs. (2) and (3):

$$\lambda_k = \overline{v}_k^\dagger \cdot \overline{D} \cdot \overline{u}_k \quad (6)$$
$$= \overline{u}_k^\dagger \cdot \overline{D}^\dagger \cdot \overline{v}_k$$

Construction of an initial matrix is illustrated in step 200.

Source Compression

In view of the above analysis, if the receiver domain matrix $\overline{R} = \overline{D}^\dagger \cdot \overline{D}$ is full rank, then $\overline{R}$ will be represented by all its eigenvectors $\{\overline{u}_i, i=1, 2, \ldots, N\}$, since their corresponding eigenvalues are non-zero. This will be the case when all receiver measurements provide linearily independent data. In the case when some of the data are redundant, $\overline{R}$ will be rank-deficient and can then be represented by the eigenvectors $\{\overline{u}_i, i=1, 2, \ldots, L\}$ that have non-zero eigenvalues, where L<N. From eq. (5):

$$\overline{u}_k = \frac{1}{\lambda_k} \overline{D}^\dagger \cdot \overline{v}_k, \quad k = 1, 2, \ldots, L \quad (7)$$
$$= \frac{1}{\lambda_k} \sum_{i=1}^{M} v_{k,i} \overline{r}_i^*, \quad k = 1, 2, \ldots, L$$

where $\overline{r}_i$ is the i-th row of the data matrix $\overline{D}$ whose elements are the receiver measurements corresponding to the i-th transmitter. Equation (7) can be interpreted as follows: $v_{k,i}$ provides the transmitter weights (in terms of the unit vectors $\overline{v}_k$) needed to compress the N redundant receiver measurements into L (L<N) linearly independent (non-redundant) measurements corresponding to the L eigenvectors $\overline{u}_k$ of the receiver domain matrix $\overline{R}$ that have non-zero eigenvalues. If $\overline{J}_i$ (i=1, 2, …, M) represents the moment of the i-th transmitter used in the survey, a compressed set of L (L<M,N) sources, $\overline{j}_k$, given by a weighted sum of $\overline{J}_i$, according to eq. (7), can be constructed as follows:

$$\overline{J}_k = \sum_{i=1}^{M} v_{k,i}^* \overline{J}_i, \quad (8)$$
$$k = 1, 2, \ldots, L$$

Consequently, it is possible to avoid running forward modeling code M times corresponding to the M physical sources that were used in the survey. More particular, it is only necessary to run the forward modeling code L times (L<M,N) corresponding to the L compressed sources that are synthesized from the physical sources according to eq. (8). Construction of a set of L sources is depicted in step 202. Running the forward modeling code L times is depicted in step 204.

Receiver Compression

If the transmitter domain matrix $\overline{S} = \overline{D} \cdot \overline{D}^\dagger$ is full rank, then $\overline{S}$ will be represented by all its eigenvectors $\{\overline{v}_i, i=1, 2, \ldots, M\}$, since their corresponding eigenvalues are non-zero. This will be the case when all transmitters provide linearly independent data. In the case when some of the data are redundant, $\overline{S}$ will be rank-deficient and can then be represented by the eigenvectors $\{\bar{v}_i, i=1, 2, \ldots, L\}$ that have non-zero eigenvalues, where L<M. From eq. (4):

$$\bar{v}_k = \frac{1}{\lambda_k} \overline{\overline{D}} \cdot \bar{u}_k, \qquad k = 1, 2, \ldots, L \qquad (9)$$

$$= \frac{1}{\lambda_k} \sum_{i=1}^{N} u_{k,i} \bar{c}_i, \qquad k = 1, 2, \ldots, L$$

where $\bar{c}_i$ is the i-th column of the data matrix $\overline{\overline{D}}$ whose elements are the measurements at the i-th receiver for all M sources. Equation (9) can be interpreted as follows: $u_{k,i}$ provides the receiver weights (in terms of the unit vectors $\bar{u}_k$) needed to compress the M redundant transmitter firings into L (L<M) linearly independent (non-redundant) firings corresponding to the L eigenvectors $\bar{v}_k$ of the transmitter domain matrix $\overline{\overline{S}}$ that have non-zero eigenvalues. The vector of measured receiver response, $\{\bar{c}_i, i=1, 2, \ldots, N\}$, for a particular i-th receiver incorporating all transmitter firings, can then be compressed into a set of L (L<M,N) data sets given by a weighted sum of $\bar{c}_i$, according to eq. (9), as follows:

$$\bar{C}_k = \sum_{i=1}^{N} u_{k,i} \bar{c}_i, \qquad (10)$$

$$k = 1, 2, \ldots, L$$

Compressing the data into a set of L data points is depicted in step 206. Consequently, that rather than using N row receiver responses in the inversion that correspond to the N physical receivers that were used in the survey, it is only necessary to use L (L<M,N) compressed data sets constructed from the row data according to eq. (10). Performing the inversion is depicted in step 208.

Overall Data Compression Strategy

In view of the description above it will be appreciated that an overall data compression strategy includes constructing a compressed set of L (L<M,N) sources, $\bar{J}_k$, given by a weighted sum of the M physical sources, $\bar{J}_i$, that were used in the survey, according to eq. (8), as follows:

$$\bar{J}_k = \sum_{i=1}^{M} v_{k,i}^* \bar{J}_i, \qquad (11)$$

$$k = 1, 2, \ldots, L$$

By doing so, the forward modeling code need only be run L times instead of M times. After computing the N receiver responses corresponding to the N physical receivers that were used in the survey, the data is further compressed into a set of L (L<M,N) data points using the weighted sum of eq. (10):

$$\bar{C}_k = \sum_{i=1}^{N} u_{k,i} \bar{c}_i, \qquad (12)$$

$$k = 1, 2, \ldots, L$$

In this case $\bar{c}_i$ (i=1, 2, ..., N) is an L×1 vector corresponding to the measured receiver responses for a particular i-th receiver incorporating all of the L transmitter firings corresponding to the L compressed sources, $\{\bar{J}_i, i=1, 2, \ldots, L\}$. By doing so, the number of data points used in the inversion is reduced from N to L for every source firing. Hence, as a result of both the transmitter and receiver compressions, the total number of data points that will be used in the inversion is reduced to L×L instead of M×N. The reduced data matrix, denoted by $\bar{\bar{d}}$ is given by:

$$\bar{\bar{d}} = \overline{\overline{V}}^\dagger \cdot \overline{\overline{D}} \cdot \overline{\overline{U}} \qquad (13)$$

where $\overline{\overline{V}}$ is an M×L matrix whose columns are the vectors $\bar{v}$ and $\overline{\overline{U}}$ is an N×L matrix whose columns are the vectors $\bar{u}$.

The Inversion Strategy

Beginning at step 200, an initial data matrix $\overline{\overline{D}}$ can be either constructed based on the total field or based on the scattered field obtained from the difference between the total field and the field response of the background medium corresponding to the starting model. The second option is used for the purposes of this description. During the inversion process of step 208, the minimization is performed on a cost function defined by the differences between the elements of the compressed measurement data matrix $\bar{\bar{d}} = \overline{\overline{V}}^\dagger \cdot \overline{\overline{D}} \cdot \overline{\overline{U}}$ and those of the compressed simulated data $\bar{\bar{d}}_s$ obtained employing the data compression strategy described above that projects the simulated data onto the compressed data space through the weighted sum of eq. (12) using the compressed set of sources, $\bar{J}_k$, defined by eq. (11). After convergence, the data misfit in the uncompressed space of the physical survey (corresponding to the M transmitters and N receivers) is computed as depicted in step 210. If the data misfit is below the desired tolerance as determined at step 212, the iteration is stopped as indicated by step 214. Step 214 may also include outputting or storing a model in tangible form. If the misfit is larger than the desired tolerance as determined at step 212, the background medium is then set to this model iterate (at which the iteration converged) as indicated by step 216 and the data misfit is then used to construct the new data matrix in step 200. A new iteration cycle then proceeds as described above and the process is repeated until the data misfit in the uncompressed physical space is below the desired tolerance.

As mentioned above, step 214 may include outputting or storing a model in tangible form. The step can alternatively include a survey design where the number of source firings is limited, or where the survey duration is limited, i.e., reduced relative to a standard survey. Reducing the number of source firings reduces the time required to collect the data. The technique can also be used to do a simultaneous-source survey to obtain a maximum sensitivity in the data.

In the case when M<<N, the above scheme will lead to an over-compressed receiver data which may cause the iteration to slow-down. This can be circumvented by augmenting the data matrix, $\overline{\overline{D}}$, with additional rows that correspond to the data matrix constructed at the previous iteration cycle(s). This expands the size of the basis upon which the receiver array measurements are projected for the purpose of compression. These additional rows correspond to the scattered field data relative to a different background medium (associated with the model inverted from the previous iterations cycle(s)).

Similarly, in the case when N<<M, the above scheme will lead to an over-compressed source array which may also cause the iteration to slow-down. This situation can be circumvented by augmenting the data matrix, $\overline{\overline{D}}$, with additional columns that correspond to the data matrix constructed at the previous iteration cycle(s). This expands the size of the basis upon which the source array is projected for the purpose of compression. These additional columns correspond to the scattered field data relative to a different background medium (associated with the model inverted from the previous iterations cycle(s)).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method of processing formation survey data generated using an array of physical transmitters and an array of physical receivers, the method comprising:
   (i) producing excitations in the formation using the array of physical transmitters;
   (ii) detecting the excitations using the array of physical receivers to generate survey data;
   (iii) calculating a weighted sum for the array of physical transmitters, wherein the weighted sum comprises a weight for each of the physical transmitters;
   (iv) calculating a compressed data set for the survey data in which a number of physical transmitters is reduced by the weighted sum to a number of representative transmitters in the compressed data set, wherein calculating the compressed data set comprises constructing the compressed data set of L (L<M,N) transmitters ($\bar{J}_k$) as follows:

$$\bar{J}_k = \sum_{i=1}^{M} v_{k,i}^* \bar{J}_i,$$

$$k = 1, 2, \ldots, L,$$

wherein M is the number of physical transmitters, N is the number of physical receivers, L is the number of representative transmitters in the compressed data set, $\bar{J}_i$ is the weighted sum for represents the M physical transmitters, and $v_{k,i}$ provides transmitter weights;
   (v) performing an inversion using the compressed data set; and
   (vi) outputting a result of the inversion in tangible form.

2. The method of claim 1, further comprising:
   before process (v), running forward modeling code L times.

3. The method of claim 1, wherein outputting a result in tangible form includes outputting a model.

4. The method of claim 1, wherein outputting a result in tangible form includes outputting a simultaneous-source survey design.

5. The method of claim 1, wherein $v_{k,i}$ provides transmitter weights in terms of a unit vector.

6. The method of claim 1, further comprising:
   calculating a weighted sum for the array of physical receivers, wherein the weighted sum comprises a weight for each of the physical receivers;
   compressing the compressed data set further into a set of L (L<M,N) data points ($\bar{C}_k$) in which a number of physical receivers is reduced by the weighted sum for the array of physical receivers to a number of representative receivers in the compressed data set as follows:

$$\bar{C}_k = \sum_{i=1}^{N} u_{k,i} \bar{c}_i,$$

$$k = 1, 2, \ldots, L,$$

wherein M is the number of physical transmitters, N is the number of physical receivers, L is the number of representative receivers in the compressed data set, $\bar{c}_i$ represents the N physical receivers, and $u_{k,i}$ provides receiver weights.

7. The method of claim 6, wherein process (v) includes performing a minimization on a cost function defined by differences between elements of a compressed measurement data matrix and elements of compressed simulated data obtained using the weighted sum of M physical transmitters and the weighted sum of N physical receivers.

8. The method of claim 6, wherein $u_{k,i}$ provides receiver weights in terms of a unit vector.

9. The method of claim 1, further comprising:
   after convergence in process (v), computing a data misfit in an uncompressed space of the survey data corresponding to M transmitters and N receivers.

10. The method of claim 9, further comprising:
    if the misfit does not satisfy a desired tolerance, using the data misfit to construct a new survey data set and iterating processes (iii), (iv), and (v) using the new survey data set.

11. The method of claim 10, wherein constructing the new survey data set comprises augmenting the new surey data set with additional rows or columns corresponding to a survey data set constructed at a previous iteration cycle.

12. An apparatus, comprising:
    an array of physical transmitters;
    an array of physical receivers; and
    one or more processing devices configured to function alone or in combination to:
    (i) produce excitations in a subterranean formation using the transmitters,
    (ii) detect the excitations using the receivers to generate survey data,
    (iii) calculate a weighted sum for the array of physical transmitters, wherein the weighted sum comprises a weight for each of the physical transmitters;
    (iv) calculate a compressed synthetic data set for the survey data in which a number of physical transmitters is reduced by the weighted sum to a number of representative transmitters in the compressed data set, wherein calculating the compressed data set comprises constructing the compressed data set of L (L<M,N) transmitters ($\bar{J}_k$) as follows:

$$\bar{J}_k = \sum_{i=1}^{M} v_{k,i}^* \bar{J}_i,$$

$$k = 1, 2, \ldots, L,$$

wherein M is the number of physical transmitters, N is the number of physical receivers, L is the number of representative transmitters in the compressed data set, $\bar{J}_i$ is represents the M physical transmitters, and $v_{k,i}$ provides transmitter weights, (v) perform an inversion using the compressed synthetic data set, and (vi) output a result of the inversion in tangible form.

13. The apparatus of claim 12 wherein, after process (v), the one or more processing devices are configured to run forward modeling code L times.

14. The apparatus of claim 12 wherein the one or more processing devices are configured to output a model in tangible form.

15. The apparatus of claim 12 wherein the one or more processing devices are configured to output in tangible form a simultaneous-source survey design.

16. The apparatus of claim 12, wherein $v_{k,i}$ provides transmitter weights in terms of a unit vector.

17. The apparatus of claim 12 wherein the one or more processing devices are configured to calculate a weighted sum for the array of physical receivers, wherein the weighted sum comprises a weight for each of the physical receivers, and compress the compressed synthetic data set further into a set of L (L<M,N) data points ($\overline{C}_k$) in which a number of physical receivers is reduced by the weighted sum for the array of physical receivers to a number of representative receivers in the compressed data set as follows:

$$\overline{C}_k = \sum_{i=1}^{N} u_{k,i} \overline{c}_i,$$

$$k = 1, 2, \ldots, L,$$

wherein M is the number of physical transmitters, N is the number of physical receivers, L is the number of representative receivers in the compressed synthetic data set, $\overline{c}_i$ represents N physical receivers, and $u_{k,i}$ provides receiver weights.

18. The apparatus of claim 17, wherein process (v) includes performing a minimization on a cost function defined by differences between elements of a compressed measurement data matrix and elements of compressed simulated data obtained using the weighted sum of M physical transmitters and the weighted sum of N physical receivers.

19. The apparatus of claim 17, wherein $u_{k,i}$ provides receiver weights in terms of a unit vector.

20. The apparatus of claim 12 wherein, after convergence in process (v), the one or more processing devices are configured to compute a data misfit in an uncompressed space of the survey data corresponding to M transmitters and N receivers.

21. The apparatus of claim 20 wherein, if the misfit does not satisfy a desired tolerance, the one or more processing devices are configured to use the data misfit to construct a new survey data set and iterate processes (iii), (iv), and (v) using the new survey data set.

22. The apparatus of claim 21 wherein the one or more processing devices are configured to augment the new survey data set with additional rows or columns corresponding to a survey data set constructed at a previous iteration cycle.

* * * * *